United States Patent
Hua et al.

(10) Patent No.: US 11,077,973 B2
(45) Date of Patent: Aug. 3, 2021

(54) BREAD SLICE DELIVERY DEVICE FOR AUTOMATIC SANDWICH PACKAGING MACHINE

(71) Applicant: NANTONG UNIVERSITY, Nantong (CN)

(72) Inventors: Liang Hua, Nantong (CN); Yusong Zhou, Nantong (CN); Juping Gu, Nantong (CN); Cao Zhang, Nantong (CN); Ting Ji, Nantong (CN); Fengshen Zhao, Nantong (CN); Hao Dai, Nantong (CN); Xiaojie Tian, Nantong (CN); Pengfei Li, Nantong (CN)

(73) Assignee: NANTONG UNIVERSITY, Nantong (CN)

(*) Notice: Subject to any disclaimer, the term of this patent is extended or adjusted under 35 U.S.C. 154(b) by 328 days.

(21) Appl. No.: 16/466,011

(22) PCT Filed: Aug. 1, 2018

(86) PCT No.: PCT/CN2018/097913
§ 371 (c)(1),
(2) Date: May 31, 2019

(87) PCT Pub. No.: WO2018/233723
PCT Pub. Date: Dec. 27, 2018

(65) Prior Publication Data
US 2020/0002038 A1  Jan. 2, 2020

(30) Foreign Application Priority Data
Dec. 26, 2017 (CN) .......................... 201711426975.0

(51) Int. Cl.
*B65B 35/20* (2006.01)
*B65B 25/16* (2006.01)

(52) U.S. Cl.
CPC .............. *B65B 35/20* (2013.01); *B65B 25/16* (2013.01)

(58) Field of Classification Search
CPC .......... B65B 35/10; B65B 25/16; A21C 15/00
See application file for complete search history.

(56) References Cited

U.S. PATENT DOCUMENTS

| 5,680,743 A * | 10/1997 | Hoekzema | A21C 15/00 198/399 |
| 6,421,984 B1 * | 7/2002 | Murgatroyd | B65B 25/16 53/284.7 |
| 8,407,973 B2 * | 4/2013 | Finkowski | B65B 7/164 53/540 |
| 9,969,515 B1 * | 5/2018 | Formo | B65B 59/04 |

(Continued)

*Primary Examiner* — Andrew M Tecco
(74) *Attorney, Agent, or Firm* — CMB Patent Consulting, LLC

(57) ABSTRACT

A bread slice delivery device for an automatic sandwich packaging machine. The device consists of a base plate (1), a bread receptacle base (2), a bread receptacle (3), three ball screw-type linear slide platforms, three L-shaped brackets, a rectangular push plate, two flat carrier plates, one photoelectric switch, and six proximity switches. The bread slice delivery device for an automatic sandwich packaging machine ensures that bread slices land on point accurately and that sandwich layers do not become misaligned during the delivery process; moreover, the bread storage receptacle can be swapped out easily.

4 Claims, 5 Drawing Sheets

(56) References Cited

U.S. PATENT DOCUMENTS

2003/0044267 A1\* 3/2003 Pfeiffer ................ G11B 17/038
 414/788.1
2003/0155369 A1\* 8/2003 Frem ........................ G07F 11/58
 221/92

\* cited by examiner

BREAD SLICE DELIVERY DEVICE FOR AUTOMATIC SANDWICH PACKAGING MACHINE

TECHNICAL FIELD

The present invention relates to a bread slice delivery device for automatic sandwich packaging machine.

DESCRIPTION OF THE RELATED ART

With the continuous progress and development of society, all kinds of intelligent equipment have gradually entered people's lives. The emergence of sandwich automatic packaging machine provides great convenience to life, people can eat fresh, delicious, ready-made sandwiches at any time. At present, the existing sandwich automatic packaging mechanism adopts the method of throwing or directly pushing bread when making sandwiches. The method of throwing can not guarantee the accuracy of the landing point of bread. The method of directly pushing will cause the sandwich to shift in the course of pushing the second bread, which greatly affects the overall appearance of sandwiches and multi-layer sandwiches. The production of governance. At the same time, the existing sandwich automatic packaging machine can not flexibly replace the storage barrel in terms of storage, inconvenient for the operation of staff, and can not meet the requirements of food hygiene.

TECHNICAL ISSUES

The object of the present invention is to overcome the above shortcomings and provide a bread slice delivery device for automatic sandwich packaging machine which can ensure the accurate landing point of bread slices and can flexibly replace the storage bucket without causing the sandwich interlayer shift during the pushing process.

TECHNICAL SOLUTION

A bread slice delivery device for an automatic sandwich packaging machine comprises a base plate, wherein a bread receptacle base is vertically fixed to the upper surface of the base plate, a bread receptacle is placed in the bread receptacle base, the geometric center of the bread receptacle and the geometric center of the bread receptacle base are located on the same line which is perpendicular to the base plate, and the bread receptacle is pushed into or pulled out of the bread receptacle base like a drawer; the bread slice delivery device is fixedly provided with a first ball screw-type linear slide platform which is spatially parallel to the bread receptacle and perpendicular to the base plate; a first screw nut holder of the first ball screw-type linear slide platform is connected with a first L-shaped bracket, one edge of the first L-shaped bracket is spatially parallel to the axial direction of a first ball screw of the first ball screw-type linear slide platform, and the other edge of the first L-shaped bracket is spatially perpendicular to the axial direction of the first ball screw; a first flat carrier plate is connected to the edge, spatially perpendicular to the axial direction of the first ball screw, of the first L-shaped bracket, and the first flat carrier plate is spatially perpendicular to the first ball screw and is spatially parallel to the base plate; the first flat carrier plate has a diameter slightly smaller than that of the bread receptacle, is located under the bread receptacle, and is able to move in the bread receptacle along a straight line defined by the geometric center of the bread receptacle and the geometric center of the bread receptacle base; the bread slice delivery device is further fixedly provided with a second ball screw-type linear slide platform which is located over the bread receptacle and is parallel to the base plate, and the axial direction of the second ball screw-type linear slide platform is perpendicular to a plane where the axis of the first ball screw-type linear slide platform and the geometric center of the bread receptacle are located; a second screw nut holder of the second ball screw-type linear slide platform is connected with a second L-shaped bracket, one edge of the second L-shaped bracket is spatially parallel to the axial direction of a second ball screw of the second ball screw-type linear slide platform 9, and the other edge of the second L-shaped bracket is spatially perpendicular to the axial direction of the second ball screw; a rectangular push plate is perpendicularly connected to the tail end of the edge, spatially perpendicular to the axial direction of the second ball screw, of the second L-shaped bracket, and the rectangular push plate has a width slightly greater than the thickness of bread slices and a length slightly smaller than the diameter of the bread receptacle, and is able to move in the axial direction of the second ball screw to deliver the top bread slice in the bread receptacle; a third ball screw-type linear slide platform is fixed to the left side of the plane where the axis of the first ball screw-type linear slide platform and the geometric center of the bread receptacle are located, and is located above the bread receptacle, the third ball screw-type linear slide platform is spatially perpendicular to the second ball screw-type linear slide platform and the first ball screw-type linear slide platform, and the projection of the third ball screw-type linear slide platform on the base plate is parallel to the projection of the bread receptacle on the base plate; a third screw nut holder of the third ball screw-type linear slide platform is connected with a third L-shaped bracket, one edge of the third L-shaped bracket is spatially perpendicular to the axial direction of a third ball screw of the third ball screw-type linear slide platform, and the other edge of the third L-shaped bracket is spatially parallel to the axial direction of the third ball screw; a second flat barrier plate is connected to the edge, spatially parallel to the axial direction of the third ball screw, of the third L-shaped bracket, the second flat barrier plate is spatially parallel to the axial direction of the third ball screw and is also spatially parallel to the base plate, and the second flat carrier plate is slightly larger than the bread slices and is used for storing the bread slices delivered by the rectangular push plate; and an photoelectric switch is arranged over the bread receptacle, is connected to the bread receptacle base through an photoelectric switch bracket, is spatially perpendicular to the base plate, and is used for detecting the position of the top bread slice in the bread receptacle.

The bread receptacle 3 comprises a quadrangular hollow tubular receptacle body which has a diameter slightly greater than that of the bread slices, and the bread slices are stacked and stored in the receptacle body layer by layer; equal-width first notches are formed in two ends, close to the top surface and the bottom surface of the receptacle body, of each of two opposite walls of the receptacle body at equal intervals, the first notches are located on inner sides of the walls and have a depth smaller than the thickness of the walls, and the four parallel first notches are perpendicular to four edges, which are perpendicular to the base plate, of the receptacle body; a pull plate is inserted into the pair of first notches close to the top surface of the receptacle body, and another pull plate is inserted into the pair of first notches close to the bottom surface of the receptacle body; the pull plates are able to move along the first notches, are perpendicular to the four edges of the receptacle body, and are used for sealing the receptacle body when the bread slices are delivered, and the pull plates are pulled out after the bread receptacle is placed into the bread receptacle base; two rectangular first barrier plates are respectively fixed to the walls formed with the pair of first notches close to the top surface of the receptacle body, and the two rectangular first barrier plates have a length equal to the diameter of the bread receptacle, a width slightly greater than the thickness of the bread slices, and a thickness equal to the walls, and are used for preventing the bread slices against lateral deviation during the delivery process; and a second notch is formed in the wall, which is parallel to and closest to the first ball screw-type linear slide platform, of the bread receptacle, the second notch is perpendicular to the base plate and is as high as the wall of the bread receptacle, slightly wider than the first L-shaped bracket, and as thick as the wall of the bread receptacle, and the first L-shaped bracket is able to move upwards or downwards in the second notch.

The bread receptacle base comprises two parallel guide rails which are fixed to the top surface of the base plate, the distance between the two guide rails is equal to the diameter of the bread receptacle, and the guide rails are used for guiding the bread receptacle into the bread receptacle base; two first side plates which are perpendicular to the base plate are fixed to the outer edges of the two parallel guide rails, the first side plate in contact with the second notch of the bread receptacle is formed with a third notch which is as high and as wide as the second notch, and the third notch is as thick as the first side plates and overlaps with the second notch in position; the height of two first side plates is slightly greater than the total height of the walls of the bread receptacle and the first barrier plates, and higher parts of the two first side plates are each connected with a clamp strip, and the clamp strips are parallel to the first notches and are used for preventing the bread receptacle against positional deviation; and a second side plate is perpendicularly connected with the two first side plates and is also perpendicularly connected to the base plate, and the second side plate is as high as the walls of the bread receptacle; the two first side plates and the second side plate are used for fixing the position of the bread receptacle; a second rectangular barrier plate is connected with and coplanar with the first side plate formed with the third notch, is perpendicular to the second side plate, and is located on the outer surface of the bread receptacle base, and the second rectangular barrier plate is located over the second flat carrier plate, is slightly higher than the second flat carrier plate, and is used for preventing the bread slices from moving when the second flat carrier plate is pulled out.

The first ball screw-type linear slide platform comprises a first screw fixing base, two ends of the first ball screw are fixedly connected to the first screw fixing base, and one end of the ball screw is connected with a motor shaft of a first stepping motor through a first motor coupling; the first screw nut holder is connected with the first ball screw, and the first stepping motor drives the first ball screw to push the first screw nut holder to move; and first proximity switches are mounted close to the two ends of the first ball screw, and the first proximity switches are connected and fixed to the first screw fixing base, are spatially parallel to the first ball screw, and are used for limiting the moving distance of the first screw nut holder.

The second ball screw-type linear slide platform comprises a second screw fixing base, two ends of the second ball screw are fixedly connected to the second screw fixing base, and one end of the second ball screw is connected with a motor shaft of a second stepping motor through a second motor coupling; the second screw nut holder is connected with the second ball screw, and the second stepping motor drives the second ball screw to push the second screw nut holder to move; and second proximity switches are mounted close to the two ends of the second ball screw, and the second proximity switches are connected and fixed to the second screw fixing base, are spatially parallel to the second ball screw, and are used for limiting the moving distance of the second screw nut holder.

The third ball screw-type linear slide platform comprises a third screw fixing base, two ends of the third ball screw are fixedly connected to the third screw fixing base, and one end of the third ball screw is connected with a motor shaft of a third stepping motor through a third motor coupling; the third screw nut holder is connected with the third ball screw, and the third stepping motor drives the third ball screw to push the third screw nut holder to move; and third proximity switches are mounted close to the two ends of the third ball screw, and the third proximity switches are connected and fixed to the third screw fixing base, are spatially parallel to the third ball screw, and are used for limiting the moving distance of the third screw nut holder.

After the bread receptacle is placed into the bread receptacle base, the pull plates are pulled away; the first ball screw-type linear slide platform pushes one bread slice in the bread receptacle to move upwards; when the photoelectric switch detects that the bread slice reaches a position in front of the rectangular push plate on the second ball screw-type linear slide platform, the current of the first stepping motor is cut off to stop the first stepping motor, so that the bread slice stops moving upwards; afterwards, the second stepping motor is started to drive the rectangular push plate to push the bread slice to move horizontally, and when the whole bread slice horizontally moves onto the second flat carrier plate, the current of the second stepping motor is cut off to stop the second stepping motor, so that the bread slice stops moving; and finally, the third stepping motor is started to drive the third ball screw to pull out the second flat carrier plate, the bread slice is blocked by the second barrier plate and is kept static until the second flat carrier plate is completely pulled out, then the bread slice steadily falls onto the tray, and delivery of the bread slice is completed.

Beneficial Effects

The invention has reasonable structure and is safe and reliable.

1. The invention adopts a replaceable and suction-plate sealed bread barrel structure, greatly facilitates the transportation and replacement of bread, ensures the freshness and hygiene of bread slices, reduces the labor intensity of workers, and can regularly clean and disinfect, which meets the requirements of food hygiene, and is conducive to further industrialization and commercialization of sandwich packaging machines.

2. The invention adopts a clamp bucket fixing seat, which not only facilitates the extraction and insertion of the bucket, but also ensures that the bucket will not shake during the process of pushing the bread, and improves the manufacturing accuracy of the sandwich.

3. The invention adopts a relatively stationary method for putting bread slices, and the relative stationary between the put bread slices and the already put bread slices and sandwiches can ensure that the drop point is accurate in the process of putting bread slices, and does not cause sandwich interlayer displacement, thus realizing the appearance of sandwiches neat and clean, meeting the requirements of food hygiene, and can be used in the production of multi-layer sandwiches and improving the production. The flexibility of the work makes the products diversified, which is conducive to the industrialization and commercialization of sandwich packaging machine.

DESCRIPTION OF SEVERAL VIEWS OF THE ATTACHED DRAWINGS

Figure 1:
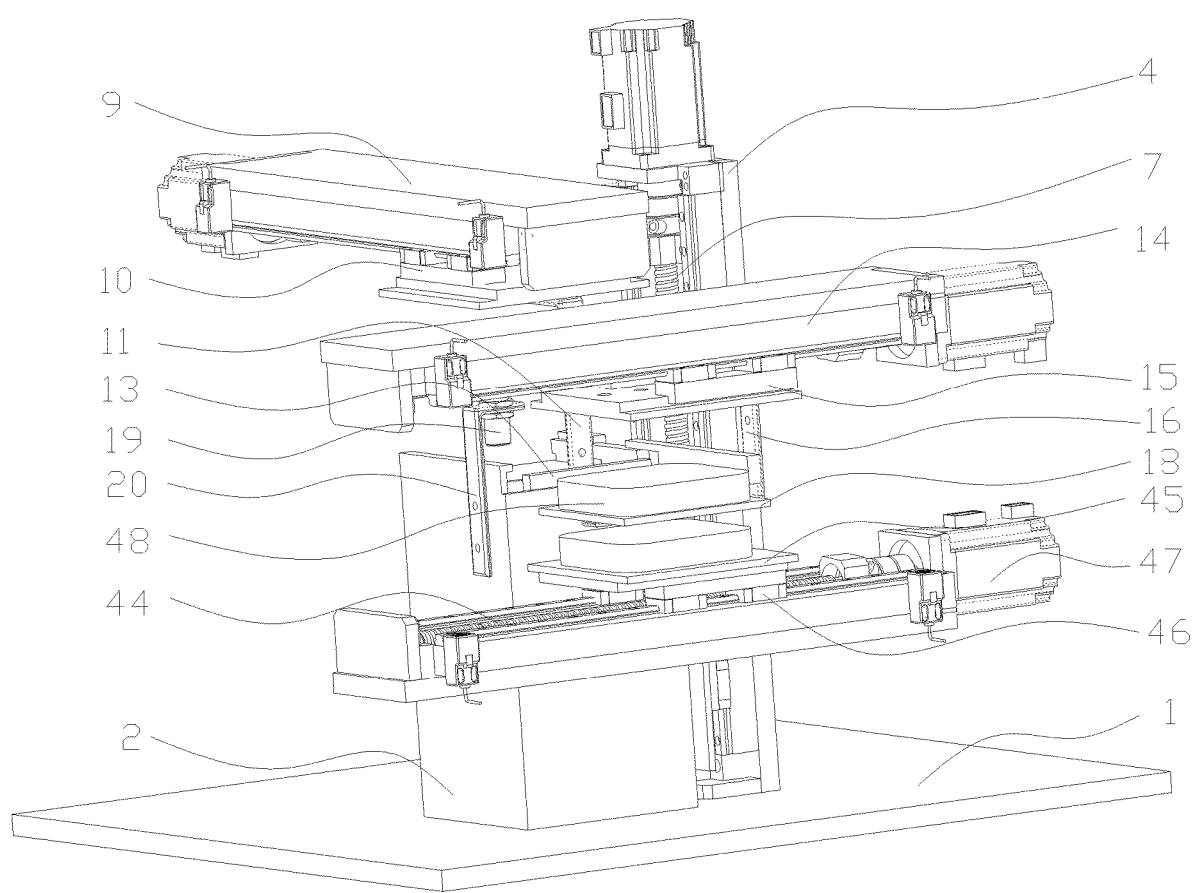
FIG. 1 is a structural diagram of one embodiment of the invention.

Reference Signs: 1, base plate; 2, bread receptacle base; 3, bread receptacle; 4, first ball screw-type linear slide platform; 5, first screw nut holder; 6, first L-shaped bracket; 7, first ball screw; 8, first flat carrier plate; 9, second ball screw-type linear slide platform; 10, second screw nut holder; 11, second L-shaped bracket; 12, second ball screw; 13, rectangular push plate; 14, third ball screw-type linear slide platform; 15, third screw nut holder; 16, third L-shaped bracket; 17, third ball screw; 18, second flat carrier plate; 19, photoelectric switch; 20, photoelectric switch bracket; 21, receptacle body; 22, first notch; 23, pull plate; 24, first barrier plate; 25, second notch; 26, guide rail; 27, first side plate; 28, third notch; 29, clamp strip; 30, second side plate; 31, second barrier plate; 32, first screw fixing base; 33, first motor coupling; 34, first stepping motor; 35, first proximity switch; 36, second screw fixing base; 37, second motor coupling; 38, second stepping motor; 39, second proximity switch; 40, third screw fixing base; 41, third motor coupling; 42, third stepping motor; 43, third proximity switch; 44, fourth ball screw; 45, tray; 46, fourth screw nut holder; 47, fourth stepping motor; 48, bread slice.

DETAILED DESCRIPTION OF THE INVENTION

Referring to FIG. 1 to FIG. 6, a bread slice delivery device for an automatic sandwich packaging machine comprises a base plate 1, wherein a bread receptacle base 2 is vertically fixed to the upper surface of the base plate 1, a bread receptacle 3 is placed in the bread receptacle base 2, the geometric center of the bread receptacle 3 and the geometric center of the bread receptacle base 2 are located on the same line which is perpendicular to the base plate 1, and the bread receptacle 3 is pushed into or pulled out of the bread receptacle base 2 like a drawer; the bread slice delivery device is fixedly provided with a first ball screw-type linear slide platform 4 which is spatially parallel to the bread receptacle 3 and perpendicular to the base plate 1; a first screw nut holder 5 of the first ball screw-type linear slide platform 4 is connected with a first L-shaped bracket 6, one edge of the first L-shaped bracket 6 is spatially parallel to the axial direction of a first ball screw 7 of the first ball screw-type linear slide platform 4, and the other edge of the first L-shaped bracket 6 is spatially perpendicular to the axial direction of the first ball screw 7; a first flat carrier plate 8 is connected to the edge, spatially perpendicular to the axial direction of the first ball screw 7, of the first L-shaped bracket 6, and the first flat carrier plate 8 is spatially perpendicular to the first ball screw 7 and is spatially parallel to the base plate 1; the first flat carrier plate 8 has a diameter slightly smaller than that of the bread receptacle 3, is located under the bread receptacle 3, and is able to move in the bread receptacle 3 along a straight line defined by the geometric center of the bread receptacle 3 and the geometric center of the bread receptacle base 2; the bread slice delivery device is further fixedly provided with a second ball screw-type linear slide platform 9 which is located over the bread receptacle 3 and is parallel to the base plate 1, and the axial direction of the second ball screw-type linear slide platform 9 is perpendicular to a plane where the axis of the first ball screw-type linear slide platform 4 and the geometric center of the bread receptacle 3 are located; a second screw nut holder 10 of the second ball screw-type linear slide platform 9 is connected with a second L-shaped bracket 11, one edge of the second L-shaped bracket 11 is spatially parallel to the axial direction of a second ball screw 12 of the second ball screw-type linear slide platform 9, and the other edge of the second L-shaped bracket 11 is spatially perpendicular to the axial direction of the second ball screw 12; a rectangular push plate 13 is perpendicularly connected to the tail end of the edge, spatially perpendicular to the axial direction of the second ball screw 12, of the second L-shaped bracket 11, and the rectangular push plate 13 has a width slightly greater than the thickness of bread slices 48 and a length slightly smaller than the diameter of the bread receptacle 3, and is able to move in the axial direction of the second ball screw 12 to deliver the top bread slice 48 in the bread receptacle; a third ball screw-type linear slide platform 14 is fixed to the left side of the plane where the axis of the first ball screw-type linear slide platform 4 and the geometric center of the bread receptacle 3 are located, and is located above the bread receptacle 3, the third ball screw-type linear slide platform 14 is spatially perpendicular to the second ball screw-type linear slide platform 9 and the first ball screw-type linear slide platform 4, and the projection of the third ball screw-type linear slide platform 14 on the base plate 1 is parallel to the projection of the bread receptacle 3 on the base plate 1; a third screw nut holder 15 of the third ball screw-type linear slide platform 14 is connected with a third L-shaped bracket 16, one edge of the third L-shaped bracket 16 is spatially perpendicular to the axial direction of a third ball screw 17 of the third ball screw-type linear slide platform 14, and the other edge of the third L-shaped bracket 16 is spatially parallel to the axial direction of the third ball screw 17; a second flat barrier plate 18 is connected to the edge, spatially parallel to the axial direction of the third ball screw 17, of the third L-shaped bracket 16, the second flat barrier plate 18 is spatially parallel to the axial direction of the third ball screw 17 and is also spatially parallel to the base plate 1, and the second flat carrier plate 18 is slightly larger than the bread slices 48 and is used for storing the bread slices 48 delivered by the rectangular push plate 13; and an photoelectric switch 19 is arranged over the bread receptacle 3, is connected to the bread receptacle base 2 through an photoelectric switch bracket 20, is spatially perpendicular to the base plate 1, and is used for detecting the position of the top bread slice 48 in the bread receptacle 3.

Figure 2:
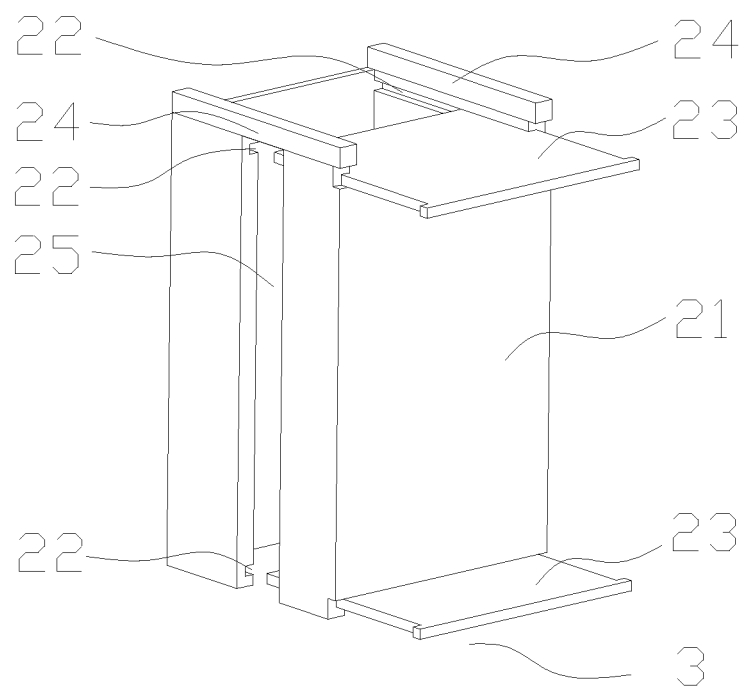
FIG. 2 is a structural diagram of a bread receptacle of the invention.

Referring to FIG. 1 and FIG. 2, the bread receptacle 3 comprises a quadrangular hollow tubular receptacle body 21 which has a diameter slightly greater than that of the bread slices 48, and the bread slices 48 are stacked and stored in the receptacle body 21 layer by layer; equal-width first notches 22 are formed in two ends, close to the top surface and the bottom surface of the receptacle body 21, of each of two opposite walls of the receptacle body 21 at equal intervals, the first notches 22 are located on inner sides of the walls and have a depth smaller than the thickness of the walls, and the four parallel first notches 22 are perpendicular to four edges, which are perpendicular to the base plate 1, of the receptacle body 21; a pull plate 23 is inserted into the pair of first notches 22 close to the top surface of the receptacle body 21, and another pull plate 23 is inserted into the pair of first notches 22 close to the bottom surface of the receptacle body 21; the pull plates 23 are able to move along the first notches 22, are perpendicular to the four edges of the receptacle body 21, and are used for sealing the receptacle body 21 when the bread slices 48 are delivered, and the pull plates 23 are pulled out after the bread receptacle 3 is placed into the bread receptacle base 2; two rectangular first barrier plates 24 are respectively fixed to the walls formed with the pair of first notches 22 close to the top surface of the receptacle body 21, and the two rectangular first barrier plates 24 have a length equal to the diameter of the bread receptacle 3, a width slightly greater than the thickness of the bread slices 48, and a thickness equal to the walls, and are used for preventing the bread slices 48 against lateral deviation during the delivery process; and a second notch 25 is formed in the wall, which is parallel to and closest to the first ball screw-type linear slide platform 4, of the bread receptacle 3, the second notch 25 is perpendicular to the base plate 1 and is as high as the wall of the bread receptacle 3, slightly wider than the first L-shaped bracket 6, and as thick as the wall of the bread receptacle 3, and the first L-shaped bracket 6 is able to move upwards or downwards in the second notch 25.

Figure 3:
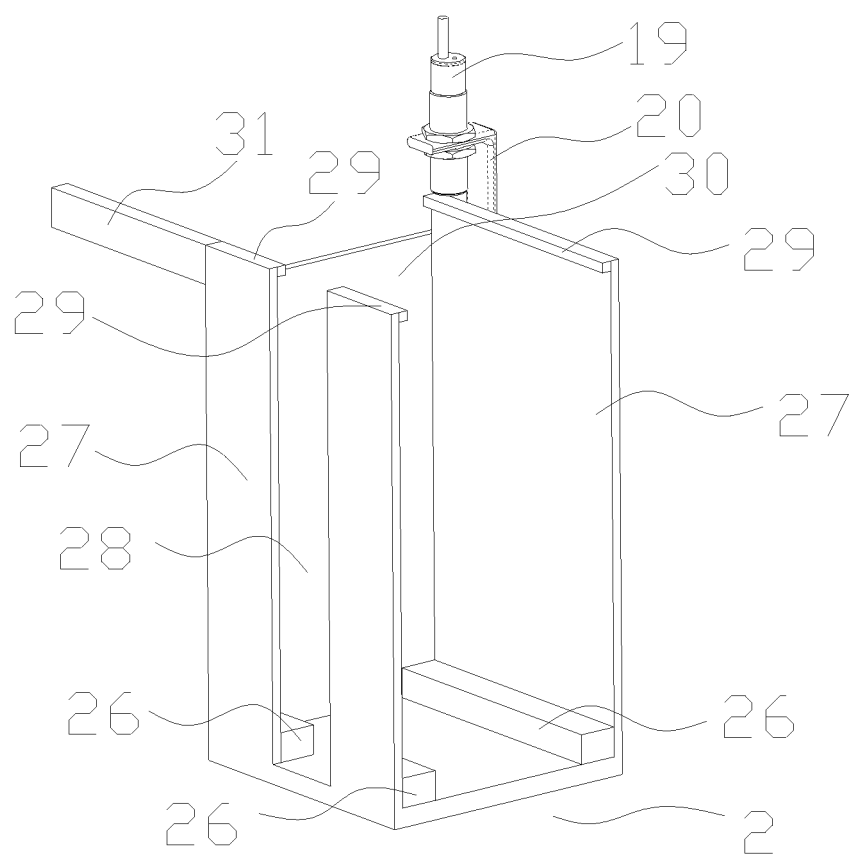
FIG. 3 is a structural diagram of a bread receptacle base of the invention.

Referring to FIG. 1 and FIG. 3, the bread receptacle base 2 comprises two parallel guide rails 26 which are fixed to the top surface of the base plate 1, the distance between the two guide rails 26 is equal to the diameter of the bread receptacle 3, and the guide rails 26 are used for guiding the bread receptacle 3 into the bread receptacle base 2; two first side plates 27 which are perpendicular to the base plate 1 are fixed to the outer edges of the two parallel guide rails 26, the first side plate 27 in contact with the second notch 25 of the bread receptacle 3 is formed with a third notch 28 which is as high and as wide as the second notch 25, and the third notch 28 is as thick as the first side plates 27 and overlaps with the second notch 25 in position; the height of two first side plates 27 is slightly greater than the total height of the walls of the bread receptacle 3 and the first barrier plates 24, and higher parts of the two first side plates 27 are each connected with a clamp strip 29, and the clamp strips 29 are parallel to the first notches 22 and are used for preventing the bread receptacle 3 against positional deviation; and a second side plate 30 is perpendicularly connected with the two first side plates 27 and is also perpendicularly connected to the base plate 1, and the second side plate 30 is as high as the walls of the bread receptacle 3; the two first side plates 27 and the second side plate 30 are used for fixing the position of the bread receptacle 3; a second rectangular barrier plate 31 is connected with and coplanar with the first side plate 27 formed with the third notch 28, is perpendicular to the second side plate 30, and is located on the outer surface of the bread receptacle base 2, and the second rectangular barrier plate 31 is located over the second flat carrier plate 18, is slightly higher than the second flat carrier plate 18, and is used for preventing the bread slices 48 from moving when the second flat carrier plate 18 is pulled out.

Figure 4:
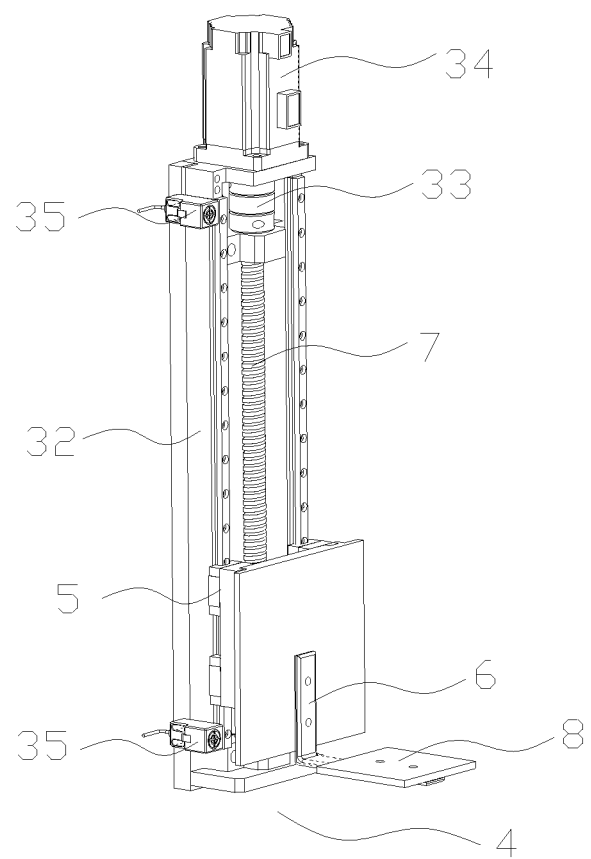
FIG. 4 is a structural diagram of a first ball screw-type linear slide platform of the invention.

Referring to FIG. 4, the first ball screw-type linear slide platform 4 comprises a first screw fixing base 32, two ends of the first ball screw 7 are fixedly connected to the first screw fixing base 32, and one end of the ball screw 7 is connected with a motor shaft of a first stepping motor 34 through a first motor coupling 33; the first screw nut holder 5 is connected with the first ball screw 7, and the first stepping motor 34 drives the first ball screw 7 to push the first screw nut holder 5 to move; and first proximity switches 35 are mounted close to the two ends of the first ball screw 7, and the first proximity switches 35 are connected and fixed to the first screw fixing base 32, are spatially parallel to the first ball screw 7, and are used for limiting the moving distance of the first screw nut holder 5.

Figure 5:
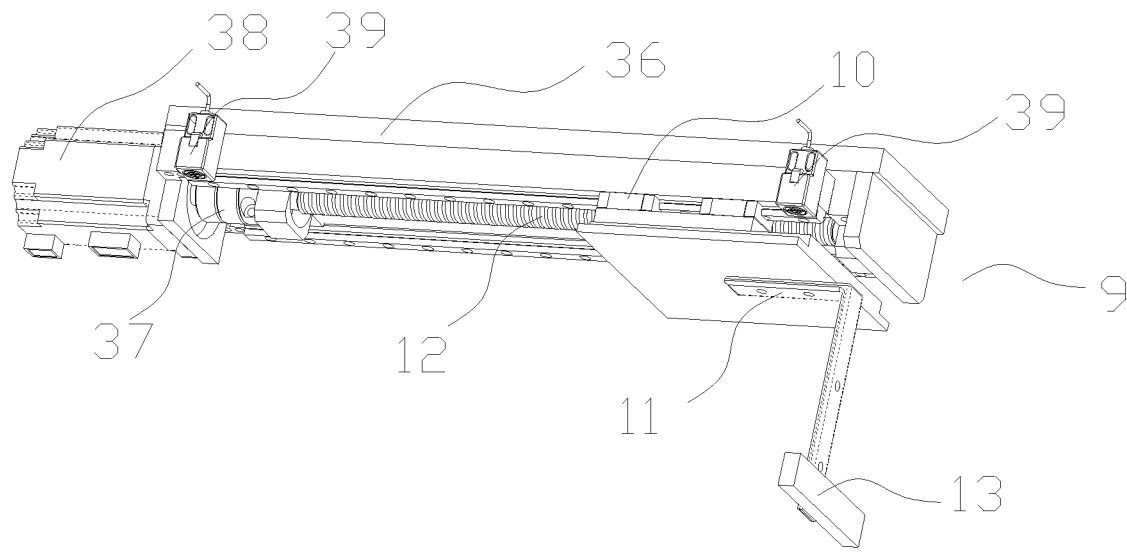
FIG. 5 is a structural diagram of a second ball screw-type linear slide platform of the invention.

Referring to FIG. 5, the second ball screw-type linear slide platform 9 comprises a second screw fixing base 36, two ends of the second ball screw 12 are fixedly connected to the second screw fixing base 36, and one end of the second ball screw 12 is connected with a motor shaft of a second stepping motor 38 through a second motor coupling 37; the second screw nut holder 10 is connected with the second ball screw 12, and the second stepping motor 38 drives the second ball screw 12 to push the second screw nut holder 10 to move; and second proximity switches 39 are mounted close to the two ends of the second ball screw 12, and the second proximity switches 39 are connected and fixed to the second screw fixing base 36, are spatially parallel to the second ball screw 12, and are used for limiting the moving distance of the second screw nut holder 10.

Figure 6:
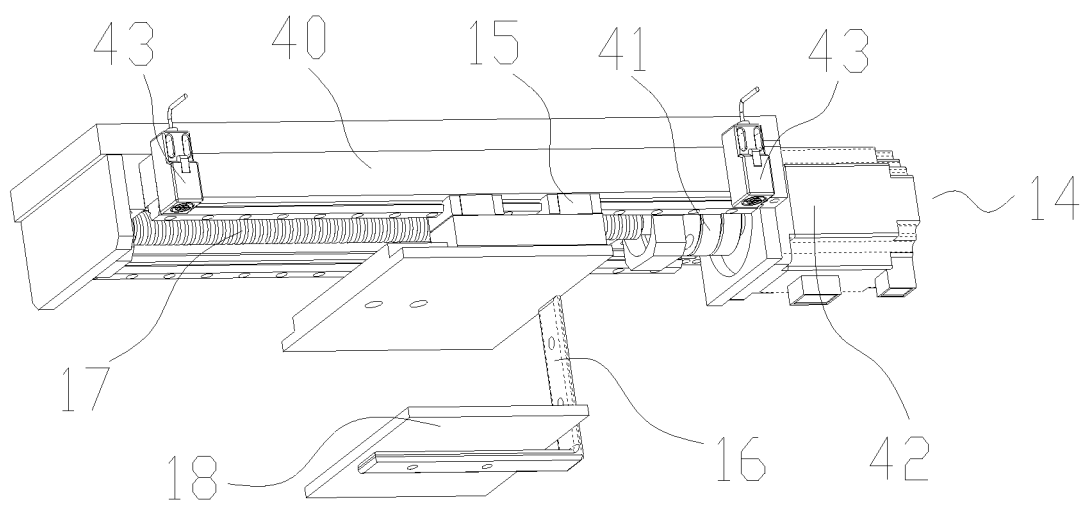
FIG. 6 is a structural diagram of a third ball screw-type linear slide platform of the invention.

Referring to FIG. 6, the third ball screw-type linear slide platform 14 comprises a third screw fixing base 40, two ends of the third ball screw 17 are fixedly connected to the third screw fixing base 40, and one end of the third ball screw 17 is connected with a motor shaft of a third stepping motor 42 through a third motor coupling 41; the third screw nut holder 15 is connected with the third ball screw 17, and the third stepping motor 42 drives the third ball screw 17 to push the third screw nut holder 15 to move; and third proximity switches 43 are mounted close to the two ends of the third ball screw 17, and the third proximity switches 43 are connected and fixed to the third screw fixing base 40, are spatially parallel to the third ball screw 17, and are used for limiting the moving distance of the third screw nut holder 15.

Referring to FIG. 1, the axial direction of a fourth ball screw 44 is parallel to the base plate 1 and is also parallel to the second ball screw 12, and the projection of the fourth ball screw 44 on the base plate 1 coincides with the projection of the second ball screw 12 on the base plate 1; and a tray 45 is fixed to a fourth screw nut holder 46 and is able to slide back and forth in the axial direction of the fourth ball screw 44, and a fourth stepping motor 47 is connected with the fourth ball screw 44 through a motor coupling.

Referring to FIG. 1 to FIG. 6, after the bread receptacle 3 is placed into the bread receptacle base 2, the pull plates 23 are pulled away; when the fourth stepping motor 47 drives the fourth ball screw 44 to push the tray 45 on the fourth screw nut holder 46 to a position under the second flat carrier plate 18, the first ball screw-type linear slide platform 4 pushes one bread slice 48 in the bread receptacle 3 to move upwards; when the photoelectric switch 19 detects that the bread slice 48 reaches a position in front of the rectangular push plate 13 on the second ball screw-type linear slide platform 9, the current of the first stepping motor 34 is cut off to stop the first stepping motor 34, so that the bread slice 48 stops moving upwards; afterwards, the second stepping motor 38 is started to drive the rectangular push plate 13 to push the bread slice 48 to move horizontally, and when the whole bread slice 48 horizontally moves onto the second flat carrier plate 18, the current of the second stepping motor 38 is cut off to stop the second stepping motor 38, so that the bread slice 48 stops moving; and finally, the third stepping motor 42 is started to drive the third ball screw 17 to pull out the second flat carrier plate 18, the bread slice 48 is blocked by the second barrier plate 31 and is kept static until the second flat carrier plate 18 is completely pulled out, then the bread slice 48 steadily falls onto the tray 45, and delivery of the bread slice 48 is completed.

What is claimed is:

1. A bread slice delivery device for an automatic sandwich packaging machine is characterized in that: comprises a base plate, wherein a bread receptacle base is vertically fixed to the upper surface of the base plate, a bread receptacle is placed in the bread receptacle base, the geometric center of the bread receptacle and the geometric center of the bread receptacle base are located on the same line which is perpendicular to the base plate, and the bread receptacle is pushed into or pulled out of the bread receptacle base like a drawer; the bread slice delivery device is fixedly provided with a first ball screw-type linear slide platform which is spatially parallel to the bread receptacle and perpendicular to the base plate; a first screw nut holder of the first ball screw-type linear slide platform is connected with a first L-shaped bracket, one edge of the first L-shaped bracket is spatially parallel to the axial direction of a first ball screw of the first ball screw-type linear slide platform, and the other edge of the first L-shaped bracket is spatially perpendicular to the axial direction of the first ball screw; a first flat carrier plate is connected to the edge, spatially perpendicular to the axial direction of the first ball screw, of the first L-shaped bracket, and the first flat carrier plate is spatially perpendicular to the first ball screw and is spatially parallel to the base plate; the first flat carrier plate has a diameter slightly smaller than that of the bread receptacle, is located under the bread receptacle, and is able to move in the bread receptacle along a straight line defined by the geometric center of the bread receptacle and the geometric center of the bread receptacle base; the bread slice delivery device is further fixedly provided with a second ball screw-type linear slide platform which is located over the bread receptacle and is parallel to the base plate, and the axial direction of the second ball screw-type linear slide platform is perpendicular to a plane where the axis of the first ball screw-type linear slide platform and the geometric center of the bread receptacle are located; a second screw nut holder of the second ball screw-type linear slide platform is connected with a second L-shaped bracket, one edge of the second L-shaped bracket is spatially parallel to the axial direction of a second ball screw of the second ball screw-type linear slide platform, and the other edge of the second L-shaped bracket is spatially perpendicular to the axial direction of the second ball screw; a rectangular push plate is perpendicularly connected to the tail end of the edge, spatially perpendicular to the axial direction of the second ball screw, of the second L-shaped bracket, and the rectangular push plate has a width slightly greater than the thickness of bread slices and a length slightly smaller than the diameter of the bread receptacle, and is able to move in the axial direction of the second ball screw to deliver the top bread slice in the bread receptacle; a third ball screw-type linear slide platform is fixed to the left side of the plane where the axis of the first ball screw-type linear slide platform and the geometric center of the bread receptacle are located, and is located above the bread receptacle, the third ball screw-type linear slide platform is spatially perpendicular to the second ball screw-type linear slide platform and the first ball screw-type linear slide platform, and the projection of the third ball screw-type linear slide platform on the base plate is parallel to the projection of the bread receptacle on the base plate; a third screw nut holder of the third ball screw-type linear slide platform is connected with a third L-shaped bracket, one edge of the third L-shaped bracket is spatially perpendicular to the axial direction of a third ball screw of the third ball screw-type linear slide platform, and the other edge of the third L-shaped bracket is spatially parallel to the axial direction of the third ball screw; a second flat barrier plate is connected to the edge, spatially parallel to the axial direction of the third ball screw, of the third L-shaped bracket, the second flat barrier plate is spatially parallel to the axial direction of the third ball screw and is also spatially parallel to the base plate, and the second flat carrier plate is slightly larger than the bread slices and is used for storing the bread slices delivered by the rectangular push plate; and a photoelectric switch is arranged over the bread receptacle, is connected to the bread receptacle base through a photoelectric switch bracket, is spatially perpendicular to the base plate, and is used for detecting the position of the top bread slice in the bread receptacle;

the bread receptacle comprises a quadrangular hollow tubular receptacle body which has a diameter slightly greater than that of the bread slices, and the bread slices are stacked and stored in the receptacle body layer by layer; equal-width first notches are formed in two ends, close to the top surface and the bottom surface of the receptacle body, of each of two opposite walls of the receptacle body at equal intervals, the first notches are located on inner sides of the walls and have a depth smaller than the thickness of the walls, and the four parallel first notches are perpendicular to four edges, which are perpendicular to the base plate, of the receptacle body; a pull plate is inserted into the pair of first notches close to the top surface of the receptacle body, and another pull plate is inserted into the pair of first notches close to the bottom surface of the receptacle body; the pull plates are able to move along the first notches, are perpendicular to the four edges of the receptacle body, and are used for sealing the receptacle body when the bread slices are delivered, and the pull plates are pulled out after the bread receptacle is placed into the bread receptacle base; two rectangular first barrier plates are respectively fixed to the walls formed with the pair of first notches close to the top surface of the receptacle body, and the two rectangular first barrier plates have a length equal to the diameter of the bread receptacle, a width slightly greater than the thickness of the bread slices, and a thickness equal to the walls, and are used for preventing the bread slices against lateral deviation during the delivery process; and a second notch is formed in the wall, which is parallel to and closest to the first ball screw-type linear slide platform, of the bread receptacle, the second notch is perpendicular to the base plate and is as high as the wall of the bread receptacle, slightly wider than the first L-shaped bracket, and as thick as the wall of the bread receptacle, and the first L-shaped bracket is able to move upwards or downwards in the second notch;

the bread receptacle base comprises two parallel guide rails which are fixed to the top surface of the base plate, the distance between the two guide rails is equal to the diameter of the bread receptacle, and the guide rails are used for guiding the bread receptacle into the bread receptacle base; two first side plates which are perpendicular to the base plate are fixed to the outer edges of the two parallel guide rails, the first side plate in contact with the second notch of the bread receptacle is formed with a third notch which is as high and as wide as the second notch, and the third notch is as thick as the first side plates and overlaps with the second notch in position; the height of two first side plates is slightly greater than the total height of the walls of the bread receptacle and the first barrier plates, and higher parts of the two first side plates are each connected with a clamp strip, and the clamp strips are parallel to the first notches and are used for preventing the bread receptacle against positional deviation; and a second side plate is perpendicularly connected with the two first side plates and is also perpendicularly connected to the base plate, and the second side plate is as high as the walls of the bread receptacle; the two first side plates and the second side plate are used for fixing the position of the bread receptacle; a second rectangular barrier plate is connected with and coplanar with the first side plate formed with the third notch, is perpendicular to the second side plate, and is located on the outer surface of the bread receptacle base, and the second rectangular barrier plate is located over the second flat carrier plate, is slightly higher than the second flat carrier plate, and is used for preventing the bread slices from moving when the second flat carrier plate is pulled out.

2. The bread slice delivery device for an automatic sandwich packaging machine according to claim 1, characterized in that: the first ball screw-type linear slide platform comprises a first screw fixing base, two ends of the first ball screw are fixedly connected to the first screw fixing base, and one end of the ball screw is connected with a motor shaft of a first stepping motor through a first motor coupling; the first screw nut holder is connected with the first ball screw, and the first stepping motor drives the first ball screw to push the first screw nut holder to move; and first proximity switches are mounted close to the two ends of the first ball screw, and the first proximity switches are connected and fixed to the first screw fixing base, are spatially parallel to the first ball screw, and are used for limiting the moving distance of the first screw nut holder.

3. The bread slice delivery device for an automatic sandwich packaging machine according to claim 1, characterized in that: the second ball screw-type linear slide platform comprises a second screw fixing base, two ends of the second ball screw are fixedly connected to the second screw fixing base, and one end of the second ball screw is connected with a motor shaft of a second stepping motor through a second motor coupling; the second screw nut holder is connected with the second ball screw, and the second stepping motor drives the second ball screw to push the second screw nut holder to move; and second proximity switches are mounted close to the two ends of the second ball screw, and the second proximity switches are connected and fixed to the second screw fixing base, are spatially parallel to the second ball screw, and are used for limiting the moving distance of the second screw nut holder.

4. The bread slice delivery device for an automatic sandwich packaging machine according to claim 1, characterized in that: the third ball screw-type linear slide platform comprises a third screw fixing base, two ends of the third ball screw are fixedly connected to the third screw fixing base, and one end of the third ball screw is connected with a motor shaft of a third stepping motor through a third motor coupling; the third screw nut holder is connected with the third ball screw, and the third stepping motor drives the third ball screw to push the third screw nut holder to move; and third proximity switches are mounted close to the two ends of the third ball screw, and the third proximity switches are connected and fixed to the third screw fixing base, are spatially parallel to the third ball screw, and are used for limiting the moving distance of the third screw nut holder.

* * * * *